United States Patent

[11] 3,619,248

[72] Inventors Norman F. Whitsitt
Plano;
Walter D. Garland, Carrollton; James K. Baxter, Richardson; William G. Setser, Richardson, all of Tex.
[21] Appl. No. 744,652
[22] Filed July 15, 1968
[45] Patented Nov. 9, 1971
[73] Assignee The Western Company of North America

[54] FRICTION REDUCING COATINGS
11 Claims, No Drawings

[52] U.S. Cl. .................................................. 117/62.1,
94/22, 117/21, 117/26, 117/63, 117/161 C, 117/161 P
[51] Int. Cl. .................................................. B44d 1/44
[50] Field of Search .......................................... 117/62.1,
132 C, 161 C, 161 UN, 161 UC, 161 H, 21, 63, 122 S; 106/178, 237; 260/29.6 HN; 252/49.3, 49, 50, 54.6, 57; 94/22

[56] References Cited
UNITED STATES PATENTS

| | | | |
|---|---|---|---|
| 2,978,343 | 4/1961 | Russo et al. | 117/122 S |
| 3,034,944 | 5/1962 | Chipman | 117/122 S |
| 3,227,652 | 1/1966 | Ackerman | 252/49.3 |
| 3,346,495 | 10/1967 | Malec et al. | 252/49.3 |
| 3,418,157 | 12/1968 | Katzer | 117/132 C |

*Primary Examiner*—William D. Martin
*Assistant Examiner*—Raymond M. Speer
*Attorney*—Richards, Harris and Hubbard ABSTRACT: Friction reducing coatings are made by adding water to a particulate hydratable polymer material having a weight average molecular weight of at least 200,000. A preferred polymer material is a mixture of sodium carboxymethylcellulose and a copolymer of acrylamide and vinylpyridine. The friction reducing coating may be applied to a surface by distributing the particulate polymer material over the surface to form a thin layer which is then wet with water or by applying a water solution of the polymer material to the surface, or by applying a slurry of the polymer material over the surface and wetting the film formed by evaporation from the slurry. The slurry of polymer material may comprise a mixture of hydratable polymer material, a gelling agent, a dispensing agent such as methanol, and a plasticizer, such as glycerol. After applying the slurry to the surface, water is added when the alcohol suspending agent has evaporated.

FRICTION REDUCING COATINGS

FIELD OF THE INVENTION

This invention relates to the chemistry of carbon compounds, and more particularly, but not by way of limitation to solvent dispersed resins.

PRIOR ART

It has been previously proposed that certain polymers can be added to lubricating oils for increasing the lubricity of the oils, as exemplified by U.S. Pat. Nos. 2,091,627; 3,234,134; 3,251,772; 3,251,906; 3,264,376; 3,278,581 and 2,304,260. It has also been suggested that certain polymers may be dispersed in a solution of an organic solvent and a binder resin to provide a low friction coating when the dispersion is applied to a surface and heated to adhere the coating to the surface.

None of the above materials is, however, suitable for many applications where a low friction coating would be useful. For example, on occasion it becomes desirable to impede human and vehicular traffic along streets during periods of civil disorder. The application of oil to surfaces of the streets would not provide a film whose friction characteristics would impede motion to the extent desired. Further, the use of an oil or hydrocarbon lubricant would present problems in removal after the disorder had been quelled.

SUMMARY

The present invention is directed to a low friction coating and a method for producing such coating which may be generally characterized as including the step of adding water to a particulate hydratable polymer material having a weight average molecular weight of at least, and preferably in excess of 200,000.

THE PREFERRED EMBODIMENTS

High molecular weight, water soluble polymers possess the ability to form a slippery membrane. The degree to which these polymers are soluble in water is determined by their molecular weight and the extent to which polar groups of molecules within the polymer can be induced to separate by external forces. Polarity within the polymer molecule is caused by the presence of either oxygen, nitrogen or sulfur alone, or in combination. The greater the density of polar and polarizable groups within the polymer, the greater will be the water solubility.

The formation of low fraction coatings by the addition of water to high molecular weight polymers can be effected in several manners, as will be explained from the following examples.

EXAMPLE I

A particulate copolymer of acrylamide and sodium acrylate, in which the acrylamide-sodium acrylate monomer units are in the ratio of 3:1, was distributed over a smooth concrete surface to form a thin layer. The particle size was such that 95 percent of the particles passed through a 20 mesh screen (U.S. standard). The copolymer, after application to the concrete surface, was wetted with water, approximately 0.8 gallon of water being sprayed over the surface of the copolymer for each pound of copolymer. Immediately after wetting the polymer and until 1½ hours thereafter, it was virtually impossible for an individual to walk over the surface without slipping or falling. After the one and one-half hour period when the copolymer surface had dried substantially due to evaporation, it was again wetted with water and reactivated by spraying another approximate 0.8 gallon of water over the surface for each pound of copolymer on the surface. Again it was virtually impossible for an individual to walk over the surface without slipping or falling. The acrylamide-sodium acrylate copolymer described above is marketed under the Trademark SEPARAN AP-30 by the Dow Chemical Co., Inc. SEPARAN AP-30 is a mildly anionic polyelectrolyte in neutral alkaline solutions and nonionic in acid solutions.

EXAMPLE II

The above experiment was repeated using another acrylamide-acrylate copolymer marketed under the Trademark RETEN A-1 by Hercules, Inc., as the particulate copolymer. The particles were sized so that 99 percent passed through a 40 mesh screen (U.S. standard). The conditions and quantities of the example I were repeated, and as in example I, it was almost impossible for an individual to walk across the treated surface without slipping or falling.

EXAMPLE III

The test of example I was repeated using still another acrylamide-acrylate copolymer marketed by Hercules Inc., under the Trademark RETEN A-5 as the particulate copolymer. The particles were sized so that at least 95 percent passed through a 10 mesh screen (U.S. standard). The conditions and quantities detailed in example I were used, and the results were that it was extremely difficult for an individual to traverse the treated surface.

EXAMPLE IV

An acrylamide-acrylate copolymer marketed by Calgon, Inc., under the Trademark D-252 was employed and the conditions and quantities of example I were used. This acrylamide-acrylate copolymer was in particulate form, and the particles sized so that at least 95 percent passed through a 10 mesh screen (U.S. standard). As in examples I-III, an extremely slippery surface was formed rendering it very difficult for an individual to traverse the treated surface.

EXAMPLE V

The test of example I was repeated with Guar Gum being used as the particulate polymer material. The Guar Gum particles were sized so that at least 95 percent passed through a 10 mesh screen (U.S. standard). The quantities and conditions of example I were employed and a very slick coating was produced.

EXAMPLE VI

Physical mixtures of various polymer materials will also produce extremely slippery surfaces. More particularly, the procedure of example I was repeated using each of the materials listed in table I.

TABLE I

| Ratio (by weight) | Polymer Material |
|---|---|
| 1:1 | Sodium carboxymethylcellulose and D-252 |
| 1:1 | SEPARAN AP-30 and RETEN A-1 |
| 1:1 | Sodium carboxymethylcellulose and RETEN A-1 |
| 1:1 | Sodium carboxymethylcellulose and SEPARAN AP-30 |
| 1:1:1 | Sodium carboxymethylcellulose, SEPARAN AP-30 and RETEN A-1 |

In each instance, there was produced an extremely slippery coating which rendered it very difficult for an individual to traverse the surface to which the coating was applied.

EXAMPLE VII

The procedure of example I was repeated using a polyacrylamide-polyamine copolymer marketed under the Trademark RETEN 210 by Hercules, Inc. The particle size was such that 99 percent of the particles passed through a 40 mesh screen (U.S. standard). This copolymer is strongly cationic. The polymer material upon being wetted produced a very slippery surface.

EXAMPLE VIII

The test of example I was repeated using a cationic polymer, RETEN 210, and an anionic polymer, sodium carboxymethylcellulose, which were combined in a weight ratio of 2:1. The RETEN 210 particles were sized as described in example VII, and the sodium carboxymethylcellulose particles were sized so that 94 percent passed through a 40 mesh screen (U.S. standard). The quantity of polymer material, water and the conditions of example I were employed as above mentioned. Immediately after wetting the polymer and until 2 hours thereafter it was virtually impossible for an individual to walk over the surface without slipping and falling. The resulting coating was an extremely durable slippery coating. The polymers were believed to have complexed to form a slick coherent membrane which strongly adhered to the concrete substrate and produced a very slippery surface.

EXAMPLE IX

The test of example I was repeated using poly(ethyleneoxide) oxide) having a weight average molecular weight of $5\times10^6$. The particle size was such that 98 percent of the particles passed through a 10 mesh screen (U.S. standard). As in the above examples, the quantities and conditions of example I were repeated and there was produced a very slippery coating.

EXAMPLE X

The test detailed in example I was repeated utilizing each of the polymer materials identified in table II upon a rough concrete surface.

TABLE II

| Ratio (by weight) | Polymer Material |
| --- | --- |
| 2:1 | RETEN 210 and sodium carboxymethylcellulose |
| 1:1 | SEPARAN AP-30 and RETEN A-1 |
| 1:1:1 | RETEN 210, RETEN A-5, RETEN A-1, and sodium carboxymethylcellulose |

In all of the above instances, a very slippery membrane was formed.

EXAMPLE XI

The test of example VIII was repeated over a rough concrete surface with an area of 1,500 square feet being covered with the polymer. Eight men attempted to carry boxes across the wetted coating, but slipped and fell repeatedly. A 115 pound woman standing in the point outside the area under test was able to move a Volkswagen automobile over the surface to which the coating had been applied by pulling on a rope attached to the vehicle. Attempts were made to traverse the treated surface with a motorcycle, but the rider was unable to maneuver the motorcycle across the surface. The surface maintained its slippery nature for two hours without application of further water.

The above examples I–XI demonstrate that a low friction coating may be produced by applying a particulate polymer to a surface, and then wetting the polymer to form a slippery membrane. It is noted that for best results, at least 95 percent of the polymer particles should pass through a 10 mesh screen (U.S. standard). A slippery coating may also be applied by distributing a slurry of the polymer material over the surface, and after evaporation of the agent used to suspend the polymer within the slurry, application of water, as will be better understood by reference to the following example.

EXAMPLE XII

A polymer slurry was compounded and contained, by weight, the following constituents:

0.50 % Klucel HA, a cellulose ether gelling agent marketed by Hercules, Inc.;
35.60% polymer material;
53.90% suspending agent (methanol); and
10.00% plasticizer (glycerol).

The polymer material comprised a mixture of, by weight, two parts RETEN 210 for each one part sodium carboxymethylcellulose.

The slurry was sprayed over a rough pavement surface in a quantity sufficient to provide 0.1 pound of polymer per square foot of surface. The suspending agent, methanol, evaporated in about 15 minutes leaving a tough flexible membrane tightly bonded to the pavement. The membrane was wetted with approximately 0.08 gallon of water per square foot creating a slippery surface equivalent to the surface described in example XI.

EXAMPLE XIII

Six pounds of the polymer material described in example VIII were distributed over a plastic sheet, the dimension of which were 10 feet by 30 feet. The surface of the polymer, after thorough wetting, was so slippery that four men found it almost impossible to either walk or crawl across the treated plastic sheet.

EXAMPLE XIV

A first soil surface was covered with 0.1 pounds per square foot of the polymer material described 0.05 pounds per square foot of the polymer material the example VIII and wetted with 0.12 gallon of water per square foot.

A second soil surface was covered with 0.05 pounds per square foot of the polymer material described in example VIII which was wetted with 0.07 gallon of water per square foot.

A 7,200 pound four-wheel drive vehicle attempting to traverse the first treated soil surface could develop only 500 pounds drawbar pull at 100 percent wheel slippage. When the vehicle was placed upon the second treated soil surface, it could only develop about 300 pounds drawbar pull at 100 percent wheel slippage. In contrast, on dry soil the vehicle could develop 5,000 to 5,500 pounds drawbar pull at 100 percent wheel slippage and on a soil surface to which had been applied 0.12 gallon of water per square foot, the same vehicle develops 2,000 to 2,500 pounds drawbar pull at 100 percent wheel slippage.

A very low friction coating may also be formed by applying a solution of polymer materials, such as those as described above, to various surfaces, though the solutions will not exhibit as durable a coating as those which are formed by application of the dry particulate polymer material to the surface, nor as durable a membrane or coating as can be obtained by applying a slurry of the polymer material to the surface and then wetting the residue of slurry after evaporation of the expending agent.

The polymer solutions generally include aqueous solutions containing from 0.01 to 25 weight percent polymer material, and exhibit very good lubricating qualities as will be gathered from the following example.

EXAMPLE XV

A round steel shaft was placed in a semicircular-shaped redwood trough with one end of the shaft exposed beyond the trough. A string was wound about the exposed end of the shaft and provided with a hook to which weights could be attached. The shaft was then covered with SAE 20 motor oil after which weights were attached to the string. The shaft required a weight of 267.5 grams to keep the shaft in motion within the redwood trough.

Various polymer solutions, detailed in table III below, were then used in lieu of the oil described above for the purpose of contrasting the low friction characteristics of the polymer solutions with that of the oil, and the results of those tests are detailed in table III:

TABLE III

| Polymer material | Percent by weight of polymer material in the water solution | Weight required to maintain motion of the shaft (grams) |
| --- | --- | --- |
| Sodium poly(styrene sulfonate) | 1.0 | 222.2 |
| Acrylamide-acrylate copolymer (Dow SA-1472) | 1.0 | 162.5 |
| Acrylamide-acrylate copolymer (SEPARAN AP-30) | 1.0 | 162.5 |
| Separan AP-30 | 0.7 | 202.8 |
| Polyoxyethylene | 1.0 | 193.0 |

Thus, it can be seen from table III that the polymer solutions all provide a coating having less friction than SAE 20 motor oil.

The low friction coatings described by the preceding examples are all directed to the use of hydratable polymers having weight average molecular weight of at least 200,000. Guar Gum, for example, has a weight average molecular weight of about 200,000, while that of poly(ethyleneoxide) is greater than 5,000,000. Any other hydratable polymer having a weight average molecular weight of at least 200,000, e.g., at least that of Guar Gum, can be used in the practice of this invention. A suitable technique for determining weight average molecular weight of these polymers is the light scattering technique disclosed in Journal of The American Chemical Society, Vol. 51, Page 452 (1961). Examples of hydratable polymer materials which may be used to form low friction coatings include, in addition to those listed above, poly(vinylpyrrolidone), cellulose ether, sodium poly(styrenesulfonate), sodium poly(acrylate), copolymers of acrylimide and vinylpyridine, and poly(acrylimides). The amount of water added to these hydratable polymers is not critical and need be only sufficient to wet the polymer surface.

As shown by the examples, the low friction coatings of this invention can be easily applied to various substrates and even reactivated after they have dried substantially by rewetting the surface with water spray, or the like. The films not only find utility in times of civil disorder to impede traffic, but can be used for many other purposes, for example, to prepare slippery landing areas for airplanes with malfunctioning landing gears, for lubrication of machine parts, and in various other uses wherein slippery, low friction surfaces are needed.

Of the polymer materials mentioned above, the preferred one is a combination of a cationic polymer such as RETEN 210 and an anionic polymer such as sodium carboxymethylcellulose in a weight ratio of 2:1, as the two polymers complex to form a very durable slippery membrane, though the other coatings are also useful.

While rather specific terms have been used to described several embodiments of the present invention, they are not intended nor should they be construed as limitations upon the invention defined by the following claims.

What is claimed is:

1. Method of inducing slipperiness to a relatively firm surface to thereby reduce friction between said surface and an object bearing thereagainst comprising:
   a. adding water to a blend of a particulate copolymer of acrylamide and vinylpyridine and particulate sodium carboxymethylcellulose, in a weight ratio of about 2 to 1, respectively, each having a weight average molecular weight of at least 200,000 to form a solution; and
   b. coating said surface with said solution before contact is made with said object.

2. The method of claim 1 wherein said solution contains from 0.01 to 25 weight percent of said polymer materials.

3. The method of claim 1 wherein said solution contains from 0.01 to 25 weight percent of said polymer materials.

4. A method of inducing slipperiness to a relatively firm surface to thereby reduce friction between said surface and an object bearing thereagainst comprising:
   a. distributing a layer over said surface of a mixture of a particulate copolymer of acrylamide and vinylpyridine and particulate sodium carboxymethylcellulose, in a weight ratio of about 2 to 1, respectively, each having a weight average molecular weight of at least 200,000; and
   b. adding sufficient water to said layer to form a slippery coherent film prior to the time contact is made with said object.

5. The method of claim 4 wherein for each pound of said polymer materials there is added thereto about 0.8 gallon of water.

6. The method of claim 4 further comprising adding sufficient makeup water to said layer to reactivate said layer after said film has dried substantially from loss of water.

7. The method of inducing slipperiness to a relatively firm surface to thereby reduce the friction between said surface and an object bearing thereagainst comprising:
   a. applying a slurry to said surface consisting essentially of a mixture of a particulate copolymer of acrylamide and vinylpyridine and particulate sodium carboxymethylcellulose, in a weight ratio of about 2 to 1, respectively, each having a weight average molecular weight of at least 200,000, a gelling agent for said slurry, a lower alcohol suspending agent, and a plasticizer;
   b. allowing said alcohol to evaporate from said slurry to leave a resulting polymer film on said surface; and
   c. wetting said film with sufficient water to form a slippery coherent film on said surface prior to contact by said object.

8. The method of claim 7 wherein said gelling agent is a cellulose ether, said lower alcohol suspending agent is methanol, and said plasticizer is glycerol.

9. The method of claim 8 wherein said polymer materials comprise less than 50 percent by weight of the slurry.

10. A relatively firm bearing surface having a friction reducing coating thereon comprising water and a mixture of a particulate copolymer of acrylamide and vinylpyridine and particulate sodium carboxymethylcellulose, in a weight ratio of about 2 to 1, respectively, each having a weight average molecular weight of at least 200,000.

11. The surface of claim 10 wherein said surface material is rough pavement.

* * * * *